United States Patent [19]

Parker

[11] 4,169,264
[45] Sep. 25, 1979

[54] SYNCHRONOUS DIGITAL DELAY LINE PULSE SPACING DECODER

[75] Inventor: Ted E. Parker, Tempe, Ariz.

[73] Assignee: Sperry Rand Corporation, New York, N.Y.

[21] Appl. No.: 921,387

[22] Filed: Jul. 3, 1978

[51] Int. Cl.$^2$ .................. G01S 9/56; H03K 13/00
[52] U.S. Cl. .................. 343/6.8 LC; 307/234; 328/119
[58] Field of Search .................. 343/6.8 LC; 307/234; 328/119

[56] References Cited

U.S. PATENT DOCUMENTS

| | | | |
|---|---|---|---|
| 3,579,235 | 5/1971 | Straub et al. | 343/6.8 LC X |
| 3,913,100 | 10/1975 | Janex | 328/119 X |
| 3,940,764 | 2/1976 | Beeswing | 307/234 X |
| 4,135,187 | 1/1979 | Borota, Jr. | 343/6.8 LC |

*Primary Examiner*—Malcolm F. Hubler
*Attorney, Agent, or Firm*—Howard P. Terry; Albert B. Cooper

[57] ABSTRACT

An air traffic control transponder includes a synchronous digital delay line decoder for providing mode selection signals in response to pulse space coded transmissions from the ground station. The decoder comprises a shift register delay line having a plurality of delay taps along which a first received pulse is shifted. A continuously running high frequency clock pulse generator via a frequency divider provides the shifting clock to the delay line. The first received pulse synchronizes the shifting clock via the frequency divider. A plurality of monostable multivibrators connected to selected taps of the delay line provide pulse detection windows in response to the first received pulse being shifted through the stages of the shift register to which the window generating monostable multivibrators are connected. The outputs from the window generators are applied as inputs to respective pulse coincidence detection devices, the second inputs thereof being connected to receive the incoming pulses. The coded pulse spacing of the received pulses is determined by coincidence between the window pulses generated in response to the delayed first pulse and the receipt of the second pulse. The decoder is utilized in the air traffic control transponder to perform both the decoding function as well as to transmit appropriate data in accordance with the detected mode represented by the transmitted pulse spacing.

24 Claims, 4 Drawing Figures

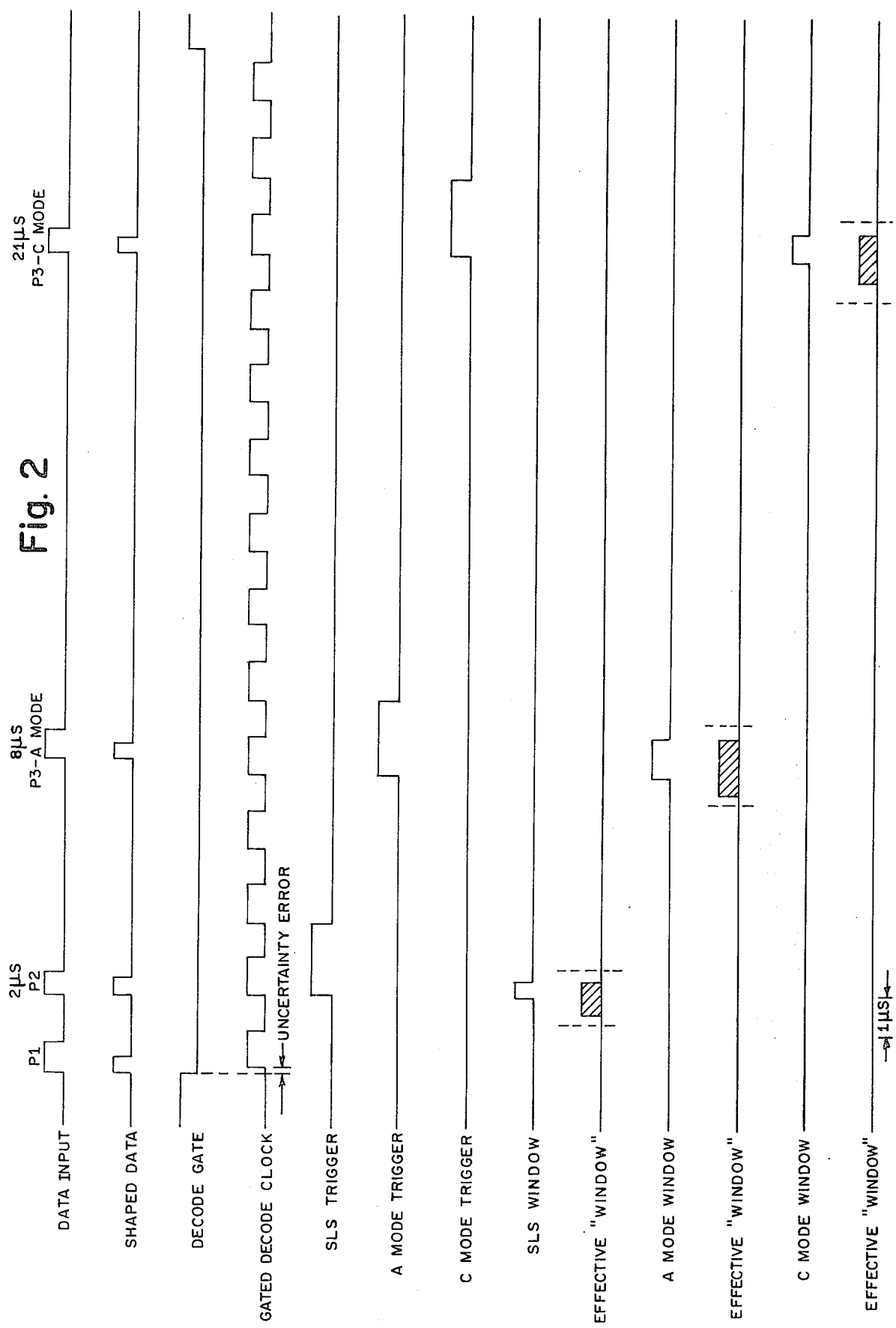

SYNCHRONOUS DIGITAL DELAY LINE PULSE SPACING DECODER

BACKGROUND OF THE INVENTION

1. Field of the Invention

The invention pertains to air traffic control (ATC) transponders, particularly with respect to the pulse spacing decoder thereof.

2. Description of the Prior Art

A system of air traffic control (ATC) has long been in existence for interrogating aircraft from ground stations via airborne ATC transponders for obtaining aircraft data from the transponder in response to the interrogation as well as for utilizing the transponder transmissions themselves to derive aircraft location data. In order to interrogate a transponder the ground station transmits a pulse pair with a spacing therebetween representative of a mode in which the airborne transponder is to respond. For example, a particular transmitted pulse spacing code triggers a transponder A-mode response in which the transponder transmits data regarding the aircraft type. A different pulse spacing may trigger a C-mode response in which the transponder transmits data regarding the aircraft altitude. A still further pulse spacing may trigger an SLS mode (side lobe suppression) for suppressing transponder transmission when the aircraft is receiving from a side lobe of the ground station antenna in a manner and for reasons well understood in the ATC art. Aviation regulatory agency specifications prescribe the various transponder modes as well as the specific pulse code spacings therefor. The agency specifications additionally prescribe permitted pulse spacing tolerances or timing "windows" for receipt of the pulses spaced apart in accordance with the various ATC commands.

The ATC airborne transducer includes a pulse spacing decoder to provide a mode decision output in accordance with the spacing between the received pulses. Generally the ATC decoder utilizes the delayed pulse coincidence technique wherein the first pulse is delayed and the delayed pulse utilized to detect coincidence with respect to the second received pulse thereby determining the pulse spacing in accordance with the imparted delay. Early transponder decoders utilized lumped constant delay lines along which the first pulse was transmitted with pulse coincidence circuits connected to appropriate taps along the line for detecting coincidence between the arrival of the second pulse and the position of the delayed pulse in the line. Lumped constant delay lines are physically large and relatively expensive. They are no longer utilized in present day transponder decoders.

In present day transponder decoders asynchronous digital delay line shift registers have replaced the lumped constant delay lines. The asynchronous digital delay line is a continuously clocked shift register with coincidence devices connected to appropriate stages of the register to provide the pulse coincidence decoding described above. The first received pulse of the coded pulse pair is entered into the line when received and clocked down the shift register by the continuously running clock to generate coincidence detection windows via window generation circuits connected to the appropriate stages of the register. Coincidence between the generated windows and the second received pulse provides the mode selection decision signals.

This prior art transponder decoder arrangement has the disadvantage that for reasonably low frequency clock signals and for shift registers of reasonable length excessive uncertainty errors are introduced into the window generation timing whereby the pulse space timing tolerances of the avionic regulatory agencies may be exceeded. This occurs because the windows are generated in synchronism with the clock pulses but the first received pulse that triggers the window generation is received at a time that is random with respect to the occurrences of the clock pulses. The data pulse may be received either in coincidence with the occurrence of a clock pulse or at any time in the interval between clock pulses. Thus although the coded spacing between the received data pulses is precisely defined, a timing uncertainty in the window generation of one clock interval is introduced into the decoder operation. In order to minimize the timing uncertainty a high frequency clock is necessitated. Thus, in order to accommodate the relatively long time intervals between the received data pulses, an exceedingly long shift register is required. Generally in practical present day transponder decoders a compromise is effected between register length and uncertainty error thus compromising system performance accuracy.

SUMMARY OF THE INVENTION

It is a desideratum of the present invention to obtain the small timing uncertainty error obtained utilizing the high frequency clock and excessively long shift register of the prior art with a low frequency shifting clock and a short shift register.

The present invention achieves this desideratum by utilizing a relatively short shift register with pulse coincidence detection circuits coupled to appropriate stages thereof for detecting coincidence with respect to the receipt of the second pulse of the received pulse pair and the first pulse delayed in accordance with the shift register stage with which the coincidence circuit is coupled. The shifting clock is arranged to start upon receipt of the first pulse.

The invention further includes window generation circuits coupled to the appropriate shift register stages for generating window pulses for application to the coincidence circuits for providing time intervals within which the pulse coincidence is sought.

The synchronized low frequency shifting clock is preferably implemented by utilizing a continuously running high frequency clock generator applied to a frequency divider which in turn provides the low frequency shifting clock to the shift register. The divider is held in a reset state until receipt of the first pulse at which time it is released to generate the synchronized low frequency clock. In this manner a gated low frequency clock is generated having a timing uncertainty with respect to the received pulse of one clock interval of the high frequency clock.

BRIEF DESCRIPTION OF THE DRAWINGS

FIG. 2 is a timing waveform diagram illustrating the timed operation of the decoder of FIG. 1.

DESCRIPTION OF THE PREFERRED EMBODIMENT

The present invention is embodied as a pulse spacing decoder for an ATC transponder configured to respond in the ATC A-mode, C-mode and SLS-mode. When the transponder is interrogated by the A-mode coded pulse pair it responds with data regarding aircraft type and identification. When the C-mode is interrogated the transponder responds with aircraft altitude data. When the transponder receives the SLS pulse spacing the aircraft is in the ground station antenna side lobe and thus in response to the SLS-mode the transponder suppresses data transmission for reasons well understood in air traffic control.

In order to transmit SLS, A-mode or C-mode commands, the ground station transmits a first pulse (P1) followed by a second pulse (P2, P3-A-mode or P3-C-mode) spaced from P1 in accordance with the desired command. The nominal spacings of the P2 and P3 pulses with respect to the first pulse are established by avionic regulatory agencies as follows:

SLS — 2µs
A-mode — 8µs
C-mode — 21µs

Since the specification permits the coded spacings to vary from the nominal values, a window of acceptable pulse spacing is specified for the receipt of the second pulse. The decoder of the present invention detects the coded spacing of the received pulse pair in accordance with the generated windows.

Figure 1:
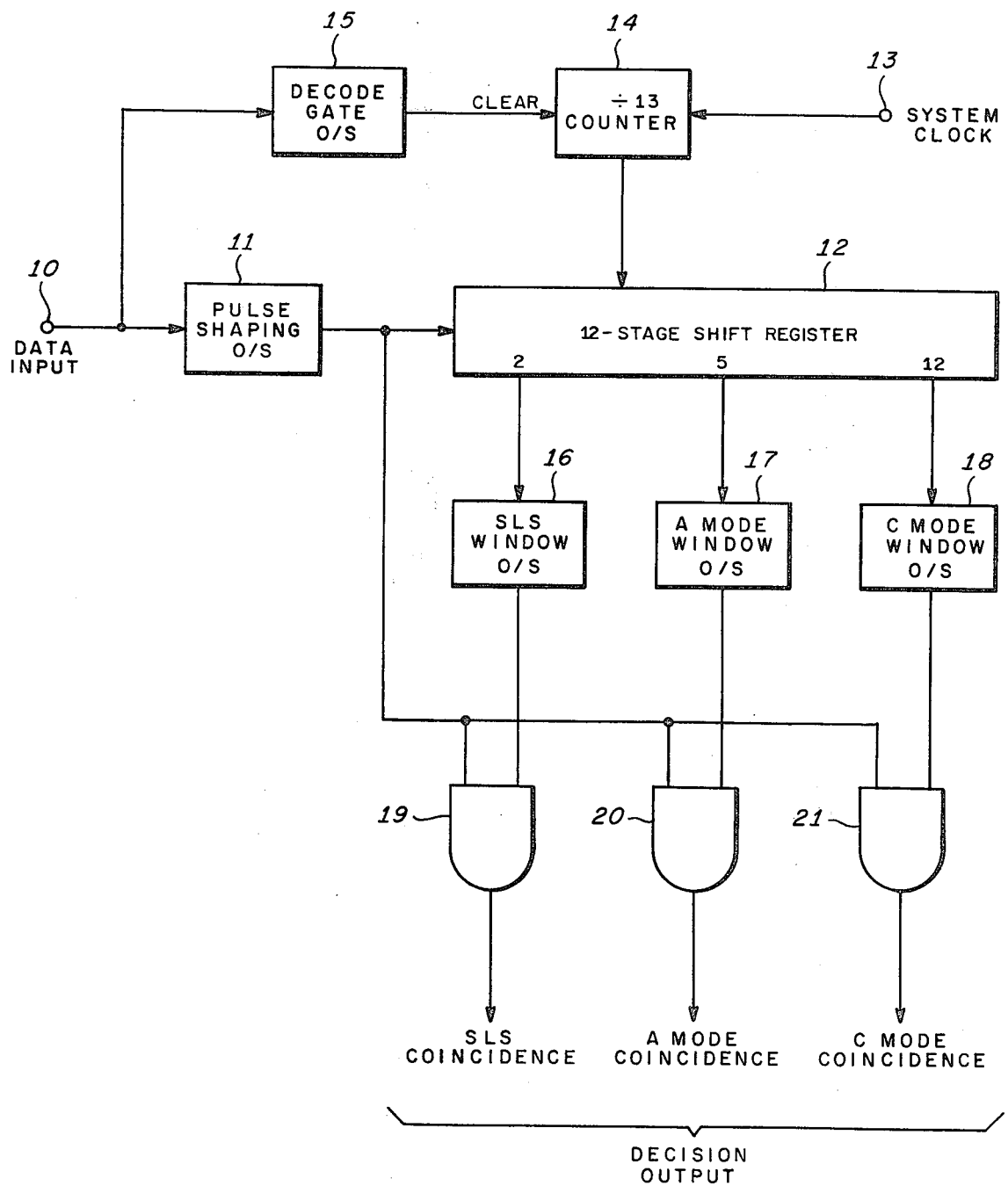
FIG. 1 is a schematic block diagram of the transponder decoder implemented in accordance with the present invention.

Referring to FIGS. 1 and 2, a schematic block diagram of the pulse spacing decoder in accordance with the invention and a corresponding waveform timing diagram are illustrated. The coded pulses received by the transponder are applied at a data input terminal 10 of the decoder. Typical data input signals are illustrated in FIG. 2 by the so designated waveform. It will be appreciated that generally the P1 pulse will be followed by either of the P3 pulses in accordance with the interrogated data mode. The P2 pulse may or may not be present depending on whether or not side lobe suppression is required. The leading edges of the received pulses trigger a pulse shaping monostable multivibrator 11 to provide the shaped data pulses illustrated by the so designated waveform of FIG. 2.

The shaped pulses from the pulse shaper 11 are applied as an input to a digital delay line shift register 12 and are clocked along the line by a system clock applied at a terminal 13 through a divide by 13 counter 14. The data input pulses at the terminal 10 are also applied to a decode gate monostable multivibrator 15 which is utilized to synchronize the shifting clock to the received pulses. The system clock applied as the input to the counter 14 is a continuously running crystal controlled oscillator and the counter 14 is a binary up/down counter set to count down.

Prior to the receipt of data the output of the decode gate 15, which is applied to the clear input of the counter 14, holds the counter in its all zeros state. The leading edge of the P1 pulse triggers the decode gate multivibrator 15 which releases the counter 14 to commence counting downward. The next occurring system clock at the terminal 13 causes the counter to go to its all ones state providing the leading edge of the first shifting clock pulse to the shift register 12. The output of the counter 14 to the shift register 12 is provided by the most significant stage thereof and since the counter is set to count down from the all zeros state, this next occurring all ones state causes the register 12 to shift in response to the first high frequency system clock pulse to occur after receipt of the leading edge of P1. The decode gate multivibrator 15 remains in its set state throughout the decoding interval. The decode gate output and gated decode clock waveforms are illustrated in FIG. 2. The uncertainty error in the system is illustrated as the time between the occurrence of the leading edge of P1 and the leading edge of the first gated decode clock pulse. This uncertainty error is no greater than the clock pulse interval of the high frequency system clock applied to the terminal 13.

Ideally to minimize the timing uncertainty error the system clock should be gated directly by P1. It was ascertained, however, that the turn on time of a crystal oscillator is too long to provide the desired minimization in uncertainty error. By the technique implemented by the elements 13, 14 and 15, the uncertainty error is reduced to the period of the system clock. In the present embodiment a clock frequency of 6.89655 MHz was utilized to drive the shift register 12 after frequency division by a factor of 13 in the counter 14. This results in an uncertainty error of 145 nanoseconds for the 12 bit shift register 12 which is utilized to provide the 21 microsecond delay required for C-mode detection. To obtain the same uncertainty error utilizing the asynchronous techniques described above would require at least a 145 bit shift register to decode the required 21 microsecond C-mode interrogation.

Since the widths of the incoming pulses may vary considerably the pulse shaping multivibrator 11 generates pulses of equal width in response thereto to provide consistent decoding operation. As the shaped P1 pulse is shifted through the register 12 by the gated clock from the counter 14 delayed outputs are provided at the register stages to trigger window generators connected to appropriate stage taps. In the present embodiment time window generating monostable multivibrators 16, 17 and 18 are connected to the second, fifth and twelfth taps to generate the SLS, A-mode and C-mode windows respectively. It will be appreciated that with the above described parameters the monostable multivibrators 16, 17 and 18 are connected to the 1.885 microsecond, 7.540 microsecond and 20.74 microsecond taps of the delay line 12 respectively. Thus as the shaped P1 pulse is shifted down the line 12 it triggers the window generating monostable multivibrators 16, 17 and 18 at the respective time intervals in accordance with the associated delay line taps. The monostable multivibrators 16, 17 and 18 therefore provide the detection windows in accordance with the associated delay line tap of a width in accordance with the multivibrator period. The trigger waveforms applied to the multivibrators 16, 17 and 18 and the resulting window waveforms therefrom are illustrated in FIG. 2 and designated as SLS, A-mode and C-mode triggers and corresponding windows respectively.

The window waveform outputs from the monostable multivibrators 16, 17 and 18 are applied as inputs to respective pulse coincidence gates 19, 20 and 21. The second input to the gates 19, 20 and 21 is provided by the shaped input pulses from the pulse shaping one shot 11. Thus the gates 19, 20 and 21 provide the decoder decision outputs in accordance with overlap between the SLS, A-mode or C-mode windows and the second of the received pulses (P2, P3-A-mode or P3-C-mode).

The overlap of any of the data pulses following P1 with one of the windows generates an SLS, A-mode or C-mode decision output. The SLS output from the gate 19 suppresses transmission of the transponder in a manner to be described. The A-mode signal from the gate 20 initiates transmission of A-mode data from the transponder back to the ground station and the C-mode output from the gate 21 similarly initiates C-mode data. The mechanization of A-mode and C-mode data transmission will be described hereinbelow with respect to FIG. 3.

The timing variations allowable by the aviation regulatory agencies with respect to ATC transponders are designated in terms of measured spacings between leading edges of pulses. The shaded areas of FIG. 2 designated as effective "windows" represent the locations of the leading edges of the shaped P2 and P3 pulses when coincidence between the shaped pulse and the associated window pulse would result in an output from the associated coincidence gate 19, 20 or 21. The dashed vertical lines represent the maximum pulse spacing variations permitted by the regulatory agencies. It is appreciated that by utilizing the present invention the mode decision outputs will occur within the permitted tolerance variations.

Thus it is appreciated that the decoder of FIG. 1 detects the presence of a data pulse at a specified time spacing subsequent to the receipt of the first data pulse (P1). Since the nominal spacing of these pulses with respect to the first pulse as exemplified above can vary from the nominal values, the windows of acceptable pulse spacings are generaed to detect the presence of the pulses within the windows. As the first data pulse is shifted down the register 12 it triggers the window generating monostable multivibrators 16, 17 and 18 at the time intervals specified above in accordance with the shift register tap to which the multivibrator is connected. Any subsequent data pulse that overlaps one of the windows generates a decision output via the coincidence gate 19, 20 or 21. The effective windows may be adjusted by varying the pulse width of the window generators as well as the pulse width of the pulse shaper 11. By utilizing the present invention the windows are generated with a tolerance variation from nominal value in accordance with one clock period of the high frequency system clock applied at the terminal 13, which in the above described embodiment is 145 nanoseconds. Therefore, by utilizing the decoder of the present invention relatively accurate decoding windows are generated utilizing only a 12 bit shift register.

Thus it is appreciated, as discussed above, that the present invention provides significantly more accurate decoding windows utilizing shorter shift registers than the asynchronous pulse spacing decoders commonly utilized in present day ATC transponders. In the preferred embodiment of the invention monostable multivibrators are utilized to generate the window waveforms. In the prior art asynchronous decoders the delayed pulse opened and closed the decode window generators from appropriate taps on the long high resolution delay lines utilized.

Figure 3A:
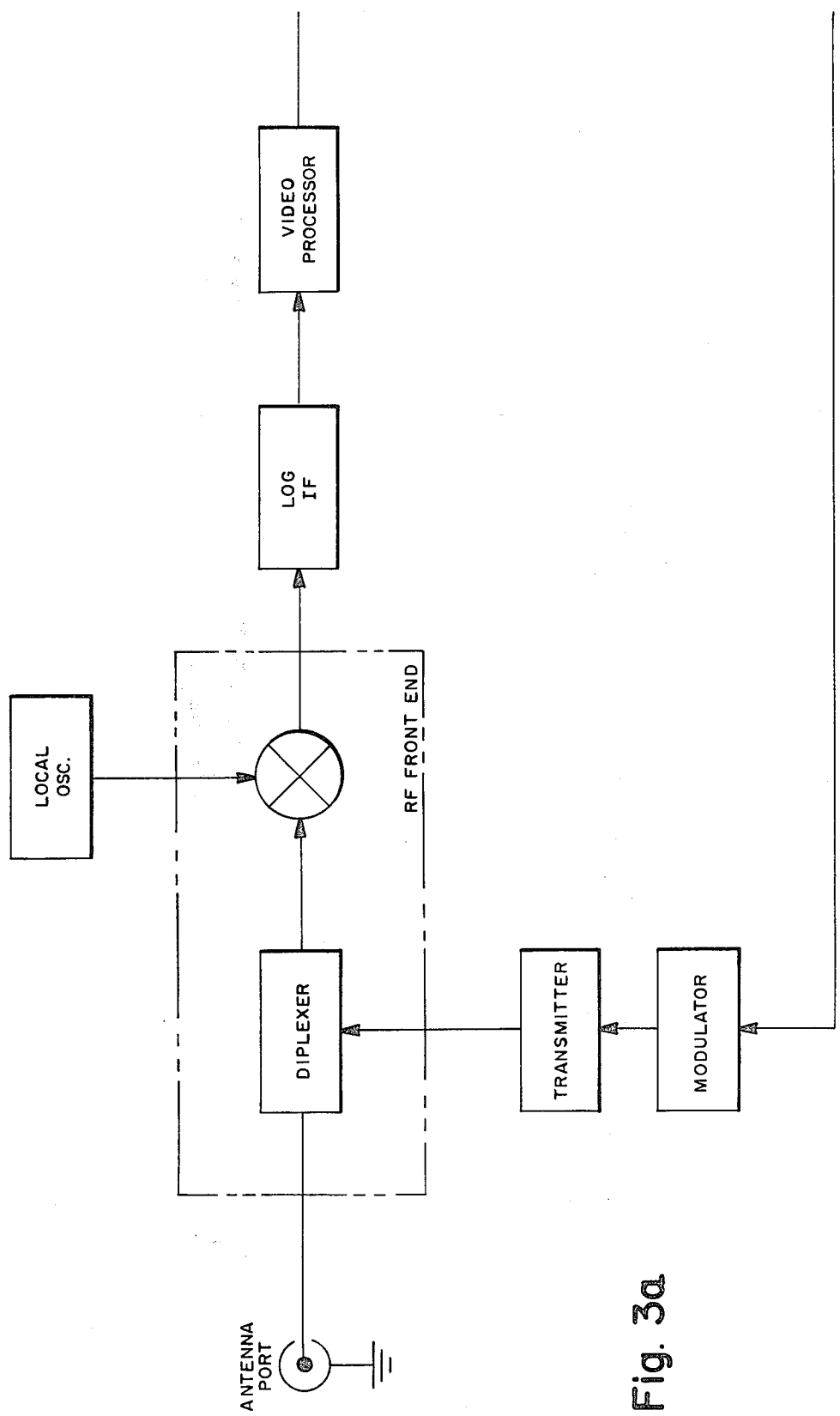
FIGS. 3a and 3b are a schematic block diagram of an ATC transponder incorporating the decoder of the present invention which is time shared for use in return data transmission of the transponder.
Figure 3B:
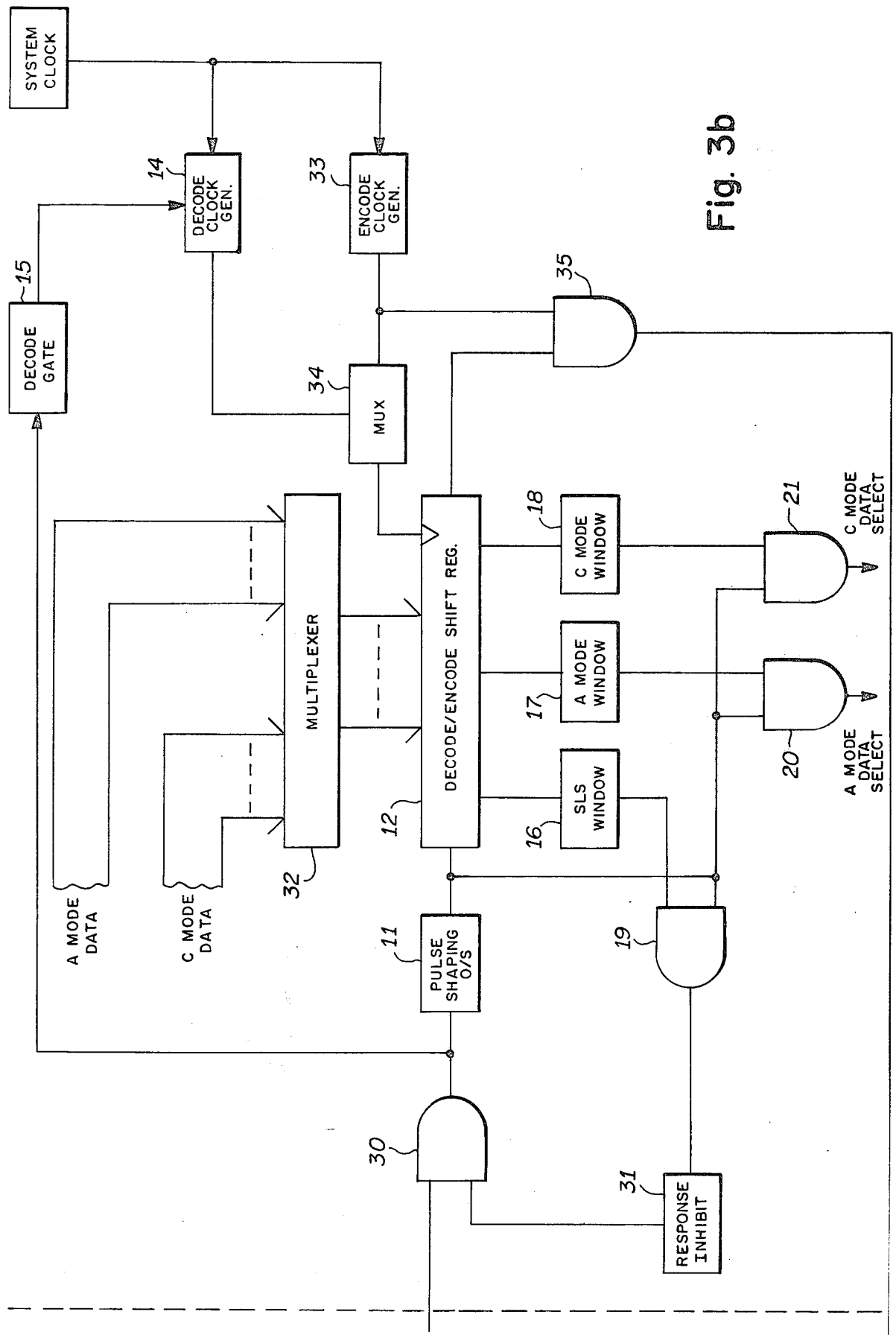

Referring to FIGS. 3a and 3b, a conventional ATC transponder is illustrated utilizing the decoding apparatus of the present invention to provide not only the pulse spacing decoding function but also a data transmission encoding function. The general configuration of the ATC transponder illustrated is well known in the art and will therefore only be briefly described herein.

The apparatus illustrated to the left of the vertical dashed line depicts the conventional transmitter-receiver apparatus of the transponder for receiving the pulse space coded rf messages and transmitting the data requested by the ground station.

The apparatus to the left of the vertical dashed line depicts the pulse spacing decoder discussed above adapted to be time shared with the transponder data transmission function. Like reference numerals indicate like components with respect to FIG. 1.

The video pulses designated above as the data input are applied through an AND gate 30 to the pulse shaping monostable multivibrator 11. The SLS coincidence output from the AND gate 19 is applied to a response inhibit circuit 31 that disables the AND gate 30 preventing transmission therethrough of the A-mode and C-mode data pulses thus rendering the transponder inactive in accordance with receipt of a side lobe transmission as previously discussed. When the aircraft is receiving the data input from the antenna main lobe and an A-mode or C-mode coincidence is detected by the gates 20 or 21 respectively, appropriate A-mode or C-mode data generators are selectively activated in accordance with the detected mode for providing the appropriate data to be transmitted to the ground station. The data is applied to the shift register 12 through a multiplexer 32. When the transponder is configured for data transmission, the system clock via an encode clock generator 33 and a multiplexer 34 shifts the data in the register 12 via an AND gate 35 for transmission to the ground station. The encode clock generator provides data transmission timing in accordance with aviation regulatory agency specifications. The AND gate 35 is utilized for strobing the data from the shift register in synchronism with the encode clock.

It will be appreciated that although the above described embodiment of the invention are explained in terms of utilizing monostable multivibrators for pulse shaping, decode gating and window generation, bistable multivibrators or flip-flops may be utilized to the same effect. Although the term monostable multivibrator has been utilized hereinabove, the term one-shot or one-shot multivibrator is also utilized to describe such devices. It is furthermore appreciated that other arrangements for synchronizing the shifting clock to the incoming data may also be utilized in practicing the invention rather than the arrangement illustrated by components 13, 14 and 15. The above illustrated embodiment of the invention was explained in terms of A-mode and C-mode pulse spacing decoding and corresponding data responses thereto. It will be appreciated that the synchronous pulse spacing decoder of the present invention may be utilized in connection with other modes to the same effect.

Although the invention was described in terms of utilization in an ATC transponder, it will be appreciated that the pulse spacing decoder of the present invention may be utilized in other environments where the unique properties thereof may be utilized to advantage. It is believed that for the first time a synchronous pulse spacing decoder has been implemented for use in an ATC transponder.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A pulse spacing decoder for a transponder for decoding the spacing between received pulses comprising at least first and second pulses, said decoder comprising shift register delay line means responsive to said first pulse and having at least one delay tap, shifting clock means providing a shifting clock signal to said delay line means for shifting said first pulse therealong, thereby providing a delayed first pulse at said delay tap, at least one coincidence detector means coupled to said delay tap and responsive to said received pulses for detecting coincidence with respect to said delayed first pulse and said received second pulse thereby providing a decision signal, and synchronizing means responsive to said received pulses and coupled to said shifting clock means for synchronizing said shifting clock signal with respect to said received first pulse.

2. The decoder of claim 1 in which said shifting clock means comprises a source of high frequency clock pulses which in operation runs continuously, and frequency divider means coupled to receive said high frequency clock pulses for providing said shifting clock signal in response thereto.

3. The decoder of claim 2 in which said synchronizing means comprises means for maintaining said frequency divider means in a predetermined state until receipt of said first pulse.

4. The decoder of claim 3 in which said frequency divider means comprises counter means having an input for setting said counter means to said predetermined state, and said synchronizing means comprises means for maintaining said counter means in said predetermined state until receipt of said first pulse.

5. The decoder of claim 4 in which said counter means comprises a down counter and said predetermined state comprises the all zeros state.

6. The decoder of claim 4 in which said synchronizing means comprises multivibrator means for providing first and second signal levels to said counter setting input, said first signal level holding said counter means in said predetermined state, said second signal level releasing said counter means to count in response to said high frequency clock pulses, and said multivibrator means switching from said first to said second signal level in response to receipt of said first pulse.

7. The decoder of claim 1 in which said coincidence detector means comprises window generator means coupled to said delay tap for providing a window pulse in response to said delayed first pulse, and coincidence gate means responsive to said window pulse and said received pulses for providing said decision signal in accordance with coincidence between said window pulse and said received second pulse.

8. The decoder of claim 7 in which said window generator means comprises multivibrator means.

9. The decoder of claim 8 in which said window generator means comprises monostable multivibrator means triggered by said delayed first pulse for providing said window pulse in accordance with the period thereof.

10. The apparatus of claim 1 in which said transponder includes transmitter-receiver means for receiving said received pulses and for transmitting data messages, said delay line means includes a plurality of delay taps, and said decoder includes a plurality of coincidence detector means coupled respectively to said delay taps for providing a corresponding plurality of decision signals in accordance with coded pulse spacings between said received first and second pulses.

11. The apparatus of claim 10 in which said transponder includes means coupled to said delay line means for providing said data messages thereto selectively in accordance with said decision signals for transmission by said transmitter-receiver means.

12. The decoder of claim 1 further including pulse shaping means responsive to said received pulses for providing shaped received pulses to said delay line means to said coincidence detector means.

13. The decoder of claim 12 in which said pulse shaping means comprises multivibrator means.

14. The decoder of claim 13 in which said pulse shaping means comprises monostable multivibrator means for shaping said received pulses to provide said shaped received pulses of uniform width in accordance with the period of said monostable multivibrator means.

15. A pulse shaping decoder for decoding the spacing between received pulses comprising at least first and second pulses, said decoder comprising shift register delay line means responsive to said first pulse and having at least one delay tap, a source of high frequency clock pulses which in operation runs continuously, frequency divider means coupled to receive said high frequency clock pulses for providing a shifting clock signal to said delay line means in response to said high frequency clock pulses for shifting said first pulse along said delay line means, thereby providing a delayed first pulse at said delay tap, at least one coincidence detector means coupled to said delay tap and responsive to said received pulses for detecting coincidence with respect to said delayed first pulse and said received second pulse thereby providing a decision signal, and synchronizing means responsive to said received pulses and coupled to said frequency divider means for maintaining said frequency divider means in a predetermined state until receipt of said first pulse, thereby synchronizing said shifting clock signal with respect to said received first pulse.

16. The decoder of claim 15 in which said frequency divider means comprises counter means having an input for setting said counter means to said predetermined state, and said synchronizing means comprises means for maintaining said counter means in said predetermined state until receipt of said first pulse.

17. The decoder of claim 16 in which said counter means comprises a down counter and said predetermined state comprises the all zeros state.

18. The decoder of claim 16 in which said synchronizing means comprises multivibrator means for providing first and second signal levels to said counter setting input, said first signal level holding said counter means in said predetermined state, said second signal level releasing said counter means to count in response to said high frequency clock pulses, and said multivibrator means switching from said first to said second signal level in response to receipt of said first pulse.

19. The decoder of claim 15 in which said coincidence detector means comprises
   window generator means coupled to said delay tap for providing a window pulse in response to said delayed first pulse, and
   coincidence gate means responsive to said window pulse and said received pulses for providing said decision signal in accordance with coincidence between said window pulse and said received second pulse.

20. The decoder of claim 19 in which said window generator means comprises multivibrator means.

21. The decoder of claim 20 in which said window generator means comprises monostable multivibrator means triggered by said delayed first pulse for providing said window pulse in accordance with the period thereof.

22. The decoder of claim 15 further including pulse shaping means responsive to said received pulses for providing shaped received pulses to said delay line means and to said coincidence detector means.

23. The decoder of claim 22 in which said pulse shaping means comprises multivibrator means.

24. The decoder of claim 23 in which said pulse shaping means comprises monostable multivibrator means for shaping said received pulses to provide said shaped received pulses of uniform width in accordance with the period of said monostable multivibrator means.

* * * * *